(12) United States Patent
Chaabi

(10) Patent No.: US 6,659,014 B2
(45) Date of Patent: Dec. 9, 2003

(54) POINT—TO—POINT TRANSPORTATION SYSTEM

(76) Inventor: Faycal Chaabi, 3 Abi Shamar, Giza (EG)

(*) Notice: Subject to any disclaimer, the term of this patent is extended or adjusted under 35 U.S.C. 154(b) by 14 days.

(21) Appl. No.: 09/725,402

(22) Filed: Nov. 29, 2000

(65) Prior Publication Data

US 2002/0062759 A1 May 30, 2002

(51) Int. Cl.[7] .................................................. B61J 3/00
(52) U.S. Cl. ..................... 104/88.03; 104/91; 104/295; 105/155
(58) Field of Search .......................... 104/88.02, 88.03, 104/89, 91, 295, 299, 300, 95; 186/7, 28, 34, 46, 48, 11; 105/148, 154, 155

(56) References Cited

U.S. PATENT DOCUMENTS

| | | | |
|---|---|---|---|
| 3,980,024 A | 9/1976 | Futer | |
| 4,000,702 A | * 1/1977 | Mackintosh | 105/148 |
| 4,015,537 A | * 4/1977 | Graef et al. | 104/107 |
| 4,030,216 A | 6/1977 | Willums | 37/320 |
| 4,165,696 A | 8/1979 | Chukhanov et al. | 104/147 |
| 4,170,944 A | 10/1979 | Zhukov et al. | 104/138 |
| 4,458,602 A | 7/1984 | Vandersteel | 104/138.1 |
| 4,522,128 A | 6/1985 | Anderson | 104/130 |
| 4,603,709 A | 8/1986 | Huisma | 137/205 |
| 4,665,829 A | 5/1987 | Anderson | 104/124 |
| 4,671,185 A | 6/1987 | Anderson et al. | 104/130 |
| 5,108,052 A | 4/1992 | Malewicki et al. | 246/5 |
| 6,070,793 A | 6/2000 | Reichl et al. | 235/375 |
| 6,109,568 A | * 8/2000 | Gilbert et al. | 104/88.03 |

FOREIGN PATENT DOCUMENTS

| | | |
|---|---|---|
| DE | 19711462 | 9/1998 |
| EP | 0911278 | 4/1999 |
| FR | 707794 | 7/1931 |
| FR | 2274482 | 1/1976 |

OTHER PUBLICATIONS

Zalud, Bill, *Pneumatics, CCTV watch cash move*, May 1993, pp. 53–54.

* cited by examiner

*Primary Examiner*—Joseph E. Valenza
(74) *Attorney, Agent, or Firm*—IPLM Group, P.A.

(57) ABSTRACT

There is provided a transportation system for transporting content from a first specified address to a second specified address. The transportation system comprises a transport channel, a plurality of containers, an operator, a propeller operatively connected to said container and in operative communication with said operator, and a central controller remote from said containers and in operative communication with said operator. The controller is configured for receiving orders for transport between the first and second addresses. In operation, the controller communicates instructions to the operator, and the operator further communicates the instructions to the propeller, causing the propeller to propel the cargo from the first address to the second address.

11 Claims, 18 Drawing Sheets

POINT—TO—POINT TRANSPORTATION SYSTEM

FIELD OF THE INVENTION

The invention relates to the field of point-to-point transportation systems, and particularly point-to-point transportation systems adapted to permit the transportation of cargo using containers.

BACKGROUND OF THE INVENTION

It is desirable to have a means of transporting cargo between points using a channel-type system, whereby multiple individual cargo containers may move rapidly and directly between distinct starting and destination points. Additionally, it is desirable to have a means to monitor the movement of cargo in such a system, and to reroute the cargo if delays arise in a portion of the transit system, or other complications arise. Additionally, it is desirable to have such a system in which multiple container sizes are available and the size is selectable to meet cargo and traffic constraints.

U.S. Pat. No. 4,458,602 of Vandersteel ("Vandersteel") discloses a pneumatic pipeline transportation system for solid containerized cargo held within containers having a cross-section substantially similar to that of the pipeline. This system relies on pressure exerted on a trapped column of air within the pipeline to move containers from point to point. Thus, the system of Vandersteel is not adapted for concurrent use by a multiplicity of containers bound for different destinations in transit at the same time. Moreover, the need for a trapped column of air for transport may limit the options available for access to the pipeline and the manner in which cargo can be loaded and unloaded from the system, particularly at intermediate points along the pipeline.

Additionally, the use of compressed air to direct the movement of the cargo may prevent the use of the system to transport two containers in different directions within the same pipeline at the same time. Moreover, the need for each container to have a cross-section substantially similar to that of the pipe-line prevents the advancement of one container past another which has been paused in the pipeline during delivery for loading or unloading. Furthermore, Vandersteel does not teach a means of monitoring the movement of cargo within the system, or of rerouting cargo once in transit.

U.S. Pat. No. 4,170,944 of Zhukov et al. ("Zhukov") teaches an arrangement for transportation of cargo in containers using compressed air for moving the containers. Each container has at least one sealing member closing the cross-sectional area of the pipeline. Thus, the arrangement of Zhukov suffers from substantially the same limitations as does the system of Vandersteel.

U.S. Pat. No. 4,165,696 of Chukhanov, et al. ("Chukhanov") teaches a liquid-filled pipeline for displacement of containers containing cargo using endless driven conveyers arranged along the pipeline and adapted to engage the containers. The use of driven conveyers along the pipeline may restrict a user's ability to efficiently direct and deliver multiple cargo containers to multiple destinations along different points in the same region of the pipeline at the same time. In particular, cargo traveling in the same direction may be driven at the same rate, due to engagement with the same conveyer. Thus, when the conveyer is stopped to permit loading or unloading, all cargo on that conveyer may be stopped, resulting in unnecessary delay. Moreover, the need for liquid in the pipeline may restrict the type of cargo transported. For example, where it is desired to transport live animals, it may be desirable to use a transport system permitting access of outside air to the container.

Thus, there is a need, as aforesaid, to provide a point-to-point transport system permitting the efficient simultaneous transport of more than one container between different starting and destination points.

SUMMARY OF THE INVENTION

The invention is directed to a point-to-point double three-dimensional transportation system wherein containers move between points in a channel or a system of interconnecting channels, and where the movement of the containers in the channel is governed by instructions relayed from a controller to the container.

In an embodiment of the invention, there is provided a transportation system for use by a shipper in the transport of content from a first point to a second point. The transportation system comprises a transport channel, a container, a controller and a propeller. The propeller is in operative communication with the operator. The controller is also in operative communication with the operator and is adapted to receive orders from the shipper. In operation, the shipper provides orders to the controller which communicates corresponding instructions to the operator which further communicates with the propeller, causing the propeller to propel the content as ordered by the shipper.

In another embodiment of the invention there is provided a container having an operator, including a coordinate identifier, wherein the container is operatively connected to the propeller.

BRIEF DESCRIPTION OF THE DRAWINGS

Without limiting the scope of the invention, preferred embodiments of the invention are illustrated in the drawings in which.

While the invention will now be described in conjunction with the illustrated embodiments, it will be understood that it is not intended to limit the invention to such embodiments. On the contrary, it is intended to cover all alternatives, modifications and equivalents as may be included within the spirt and scope of the invention as defined by the appended claims.

DETAILED DESCRIPTION OF THE PREFERRED EMBODIMENTS

Figure 1:
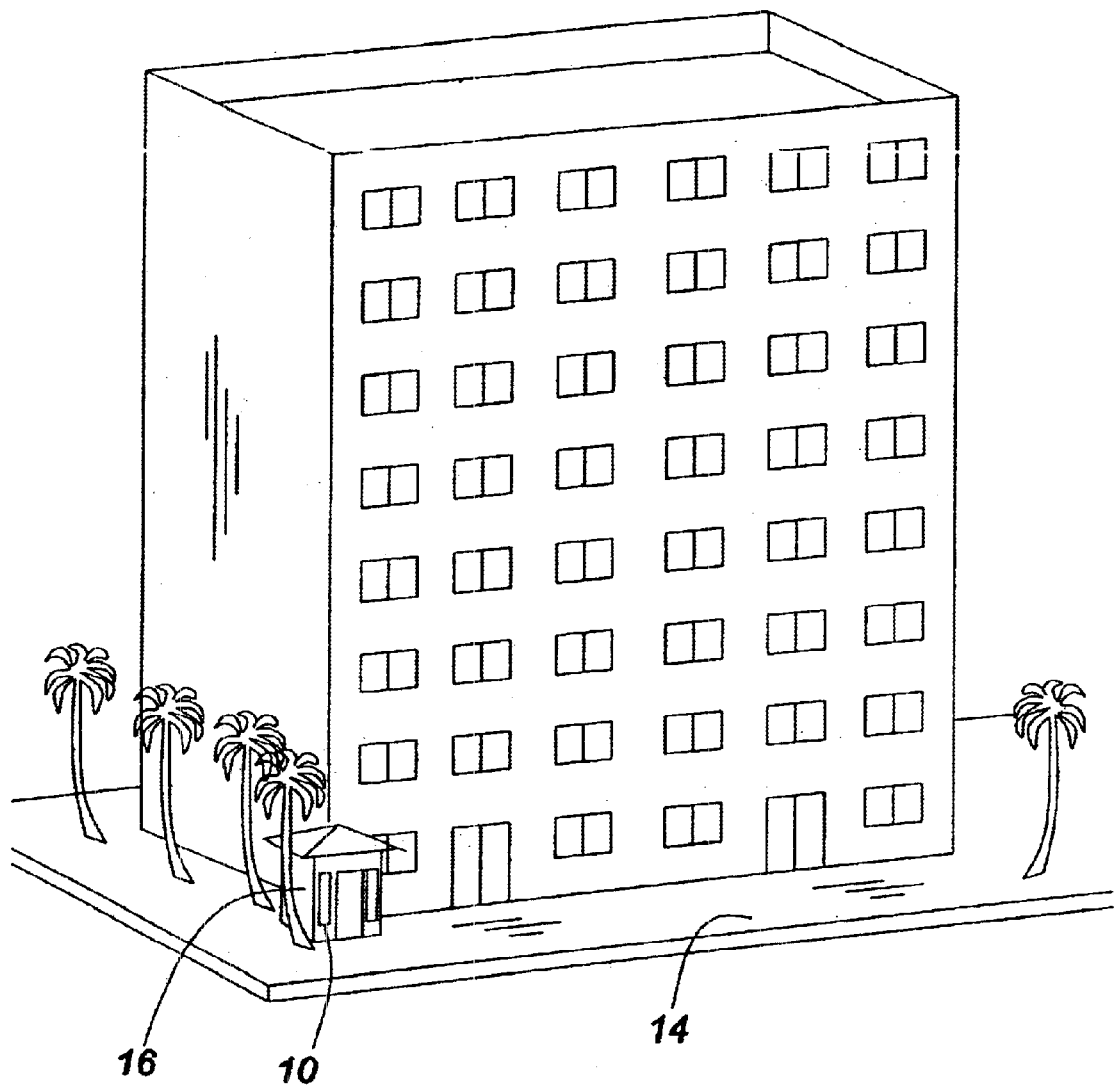
FIG. 1 is a perspective view of an embodiment of a public station of the present invention shown in proximity to a building.

FIG. 1 depicts an embodiment of the transportation system 10 of the present invention adapted for use in the transport of cargo between stations in the system without the need for transhipment, wherein the transport channel 12 (see FIG. 4) is located below the sidewalk 14. Those who send content ("shippers") can access the transportation system 10 by entering a public station 16 which permits the loading of containers 18 (see FIG. 6b) into the transport channel 12. Content may include conventional cargo, waste, livestock or humans.

Figure 2A:
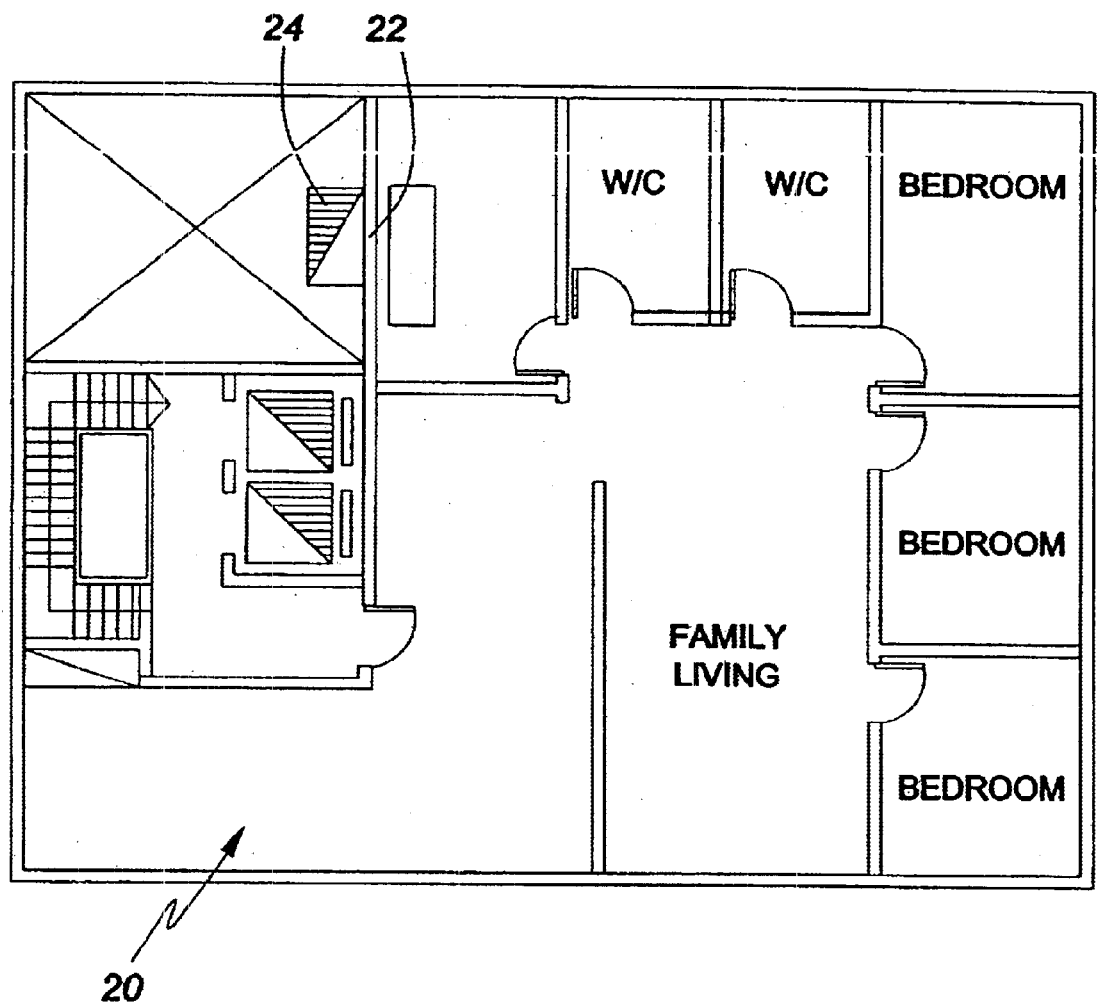
FIGS. 2a and 2b are sectional views of an embodiment of a personal station of the present invention shown within a building.

FIG. 2a depicts a portion of an embodiment of the transportation system 10 of the present invention adapted for use in the transportation of cargo to a personal station 22 in a dwelling 20. Where the dwelling 20 is located above the level of the transport channel 12, a lift 24 may be employed to raise the container and contents to the level of the personal station 22. Preferably, the system 10 includes a plurality of personal stations 22 to facilitate the uninterrupted movement of cargo from a source to a destination at the personal station of the requesting party, without the need for the requesting party to go to another location or depot to collect the cargo. As used herein a "personal station" is a point of the system 10 located at the home, workplace, or personal address of the user of the station. When fully implemented the system 10 will preferably comprise an extensive network allowing transport of content directly from a first location, which may be a personal or public station, to a final destination which may be a personal station of the beneficiary of the service. Thus, the system provides point-to-point service. This improves upon transport merely to a depot or station where the user must travel to pickup the contents transported or arrange for their delivery to their final destination.

Figure 2B:
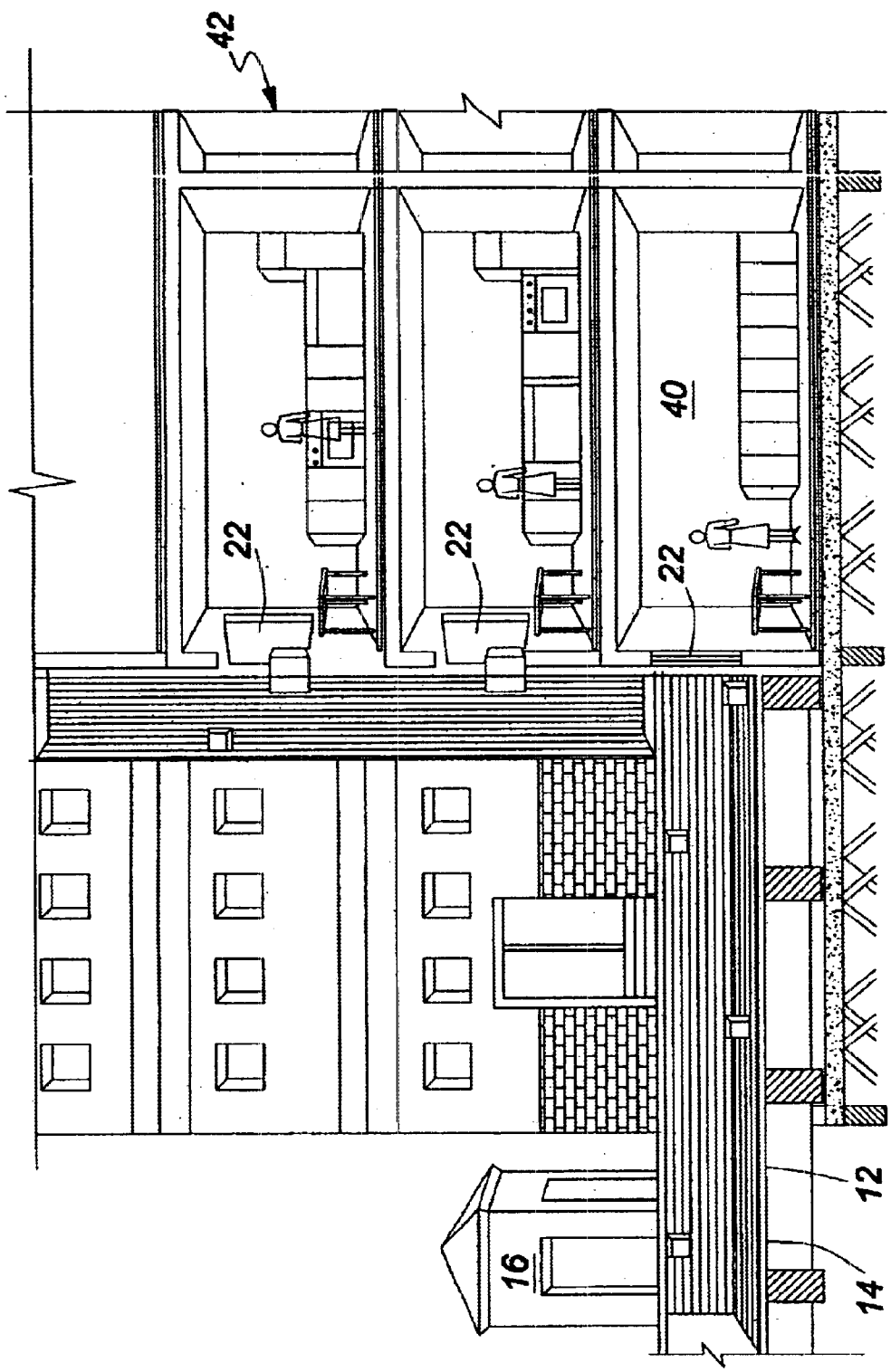

FIG. 2b depicts a side sectional view of an embodiment of the transportation system 10 of the present invention. A transport channel 12 approaches the basement 40 of a building 42 such as a dwelling. Containers 18 maybe received at personal stations 22 within the building 42. The container 18 is propelled up the vertical channel, as shown. Alternatively, a lift may be provided to facilitate the upward movement of containers 18. As will be readily appreciated, transport channels 12, branch channels 28 and portions thereof may be located above or below ground and may have longitudinal axis which are substantially horizontal, vertical, or angled relative to the ground.

Figure 3:
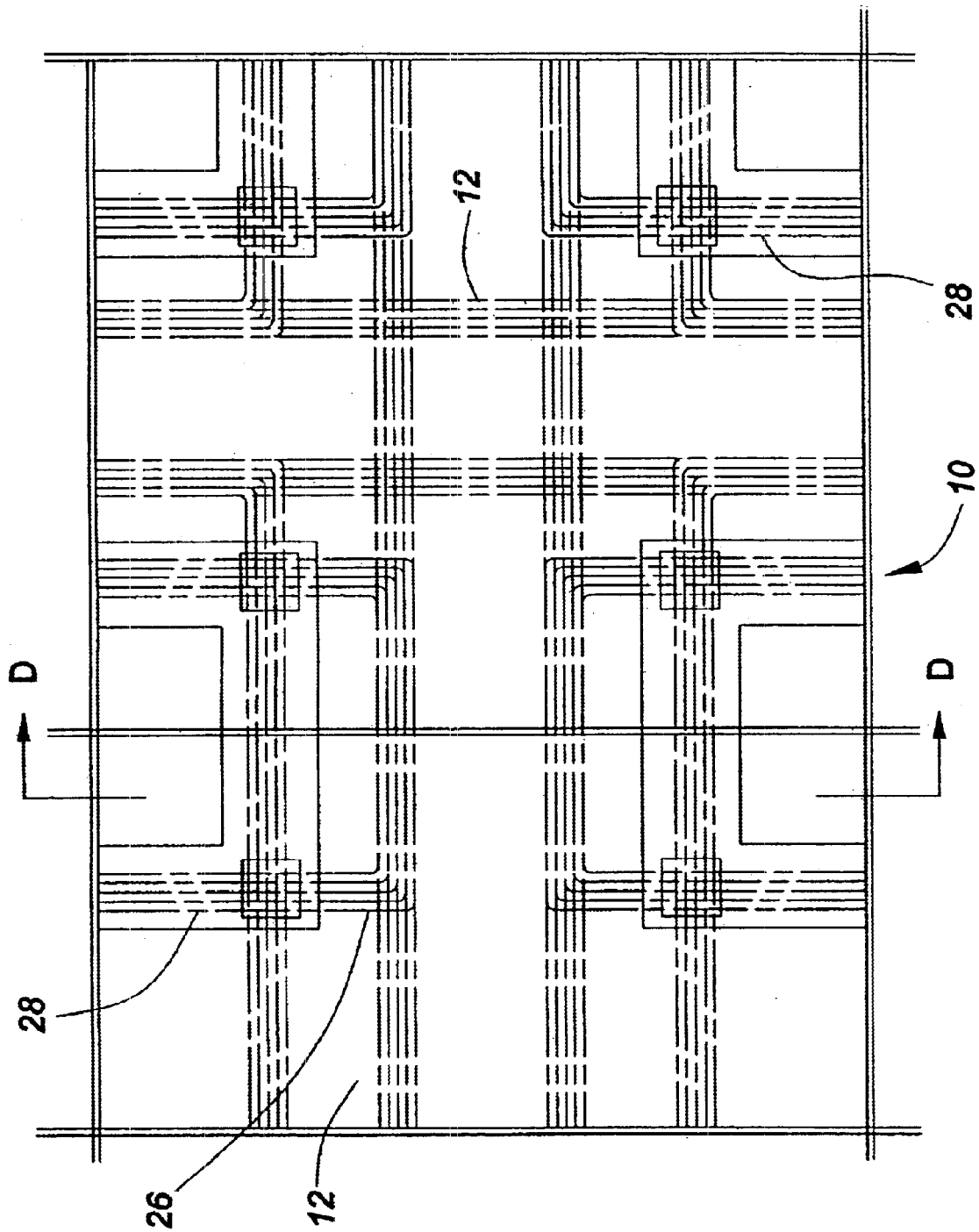
FIG. 3 is a plan view of an embodiment of the transportation system of the present invention shown in association with buildings and roads.

FIG. 3 depicts an embodiment of the transportation system 10 having a series of interconnecting transport channels 12 and branch channels 28 (collectively referred to as "channels"). Transport channels 12 connect to one another and/or branch channels 28 at junctions 26 which are adapted to permit the movement of containers 18 between channels, depending on the routing information for the particular container 18. Where transport channels 12 enter densely populated areas, or other regions where multiple closely-spaced stations are required, branch channels 28 are provided to facilitate the efficient and convenient transport and delivery of containers 18 to their destination. Channels may be of various shapes, cross-sections and cross-sectional areas and channels of different shapes, cross-sections and cross-sectional areas will operatively interconnect through the use of suitable tracks 44 and corresponding containers 18. Preferably, the containers 18 are modular. Channels may include wider regions at interconnection points to facilitate merger of incoming containers into the existing stream of container traffic.

Preferably, transport channels are subdivided into sections wherein traffic can be monitored. One or more transport channels proximal to one another are a "region". In an embodiment of the invention, the system 10 further includes transfer points adapted to facilitate the movement of a container 18 from one set of tracks 44 to another within a channel, or, in suitable cases off the tracks 44 altogether (as when the destination point is reached).

One embodiment of the system 10 is a double three-dimensional system because containers 18 can preferably move in three dimensions in channels relative to surface of the earth and can also move in three dimensions within a given channel. In one embodiment, the system is a Point-to-Point Double Three Dimensional Modular Container In Inter-Connected Channels Transport System.

Containers 18 preferably move in channels in horizontal and vertical directions relative to the surface of the earth. Channels may also extend substantially horizontally in different planes with one or more channels in each plane inter-connected to one or more channels running in a somewhat vertical direction relative to the surface of the earth such that the channels in each horizontal plane are in communication via the vertical channel. Thus, containers 18 can move in channels extending horizontally underground, on the surface, or above ground level. Containers 18 can move between channels in the different horizontal planes through vertical or partially vertical connecting channels.

Containers 18 can move in three dimensions within a given channel by moving along the longitudinal axis L, moving from side-to-side across the channel, or up and down in the channel by changing tracks.

Personal stations 22 and public stations 16 (collectively referred to as "stations") may be customized to facilitate transport of the goods of particular users. For example, the station may include a loader which facilitates efficient transport of containers 18 by calculating a suitable loading order and track 44 selection in light of package and destination information. The loader is preferably in communication with the controller and receives information on container 18 traffic from the controller. Stations may be further adapted to facilitate communication of the shipper with the controller for example, to order an empty container 18 for the shipment of cargo from the station.

Figure 4:
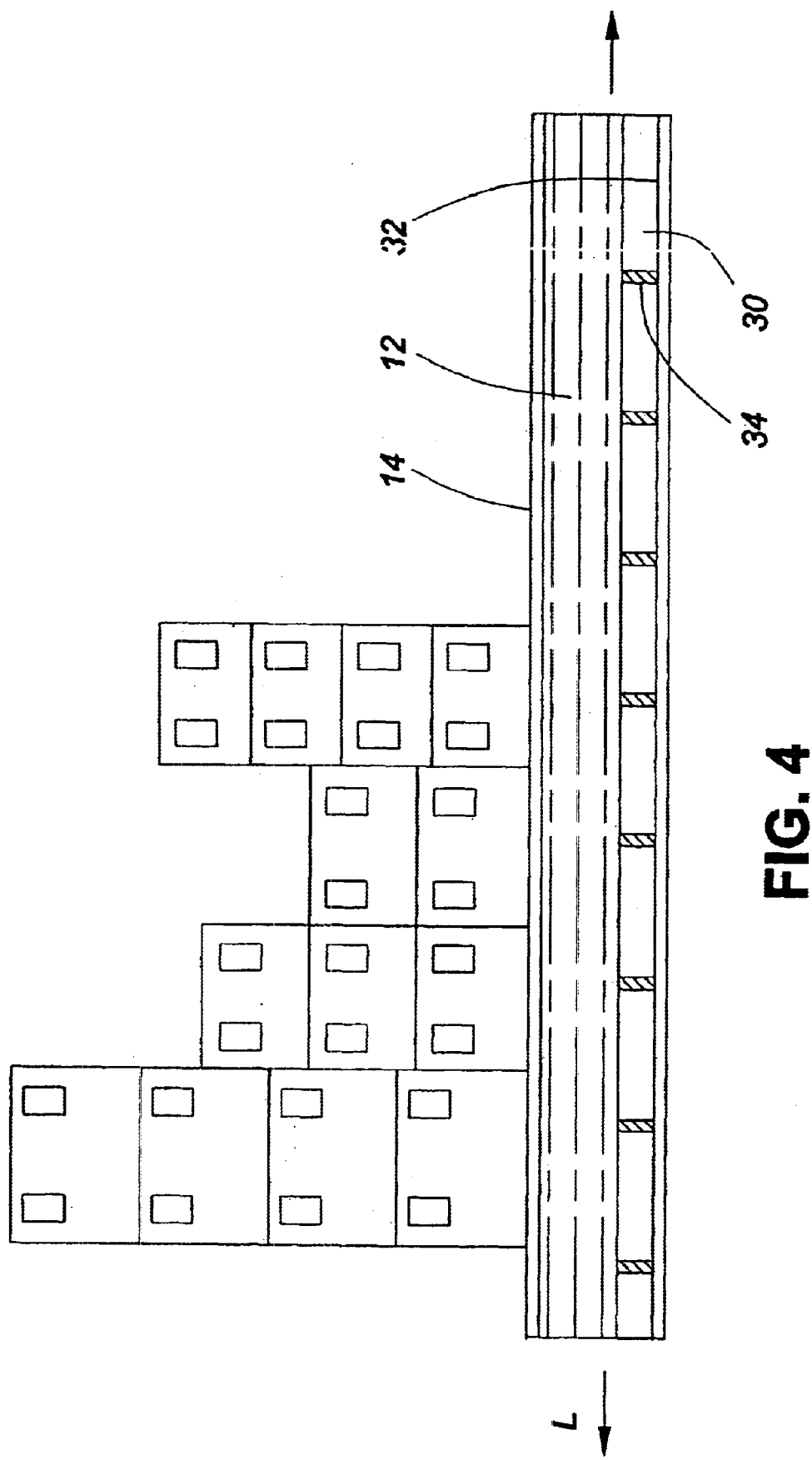
FIG. 4 is a longitudinal section of an embodiment of the transport channel of the present invention shown located proximal to a building.

FIG. 4 depicts an embodiment of the transportation system 10 of the present invention wherein the transport channel 12 is located in tunnels 30 below the sidewalk 14, and the transport channel 12 is held off the lower surface 32 of the tunnel 30 by spacers 34. The transport channel 12 has a longitudinal axis L.

Figure 5:
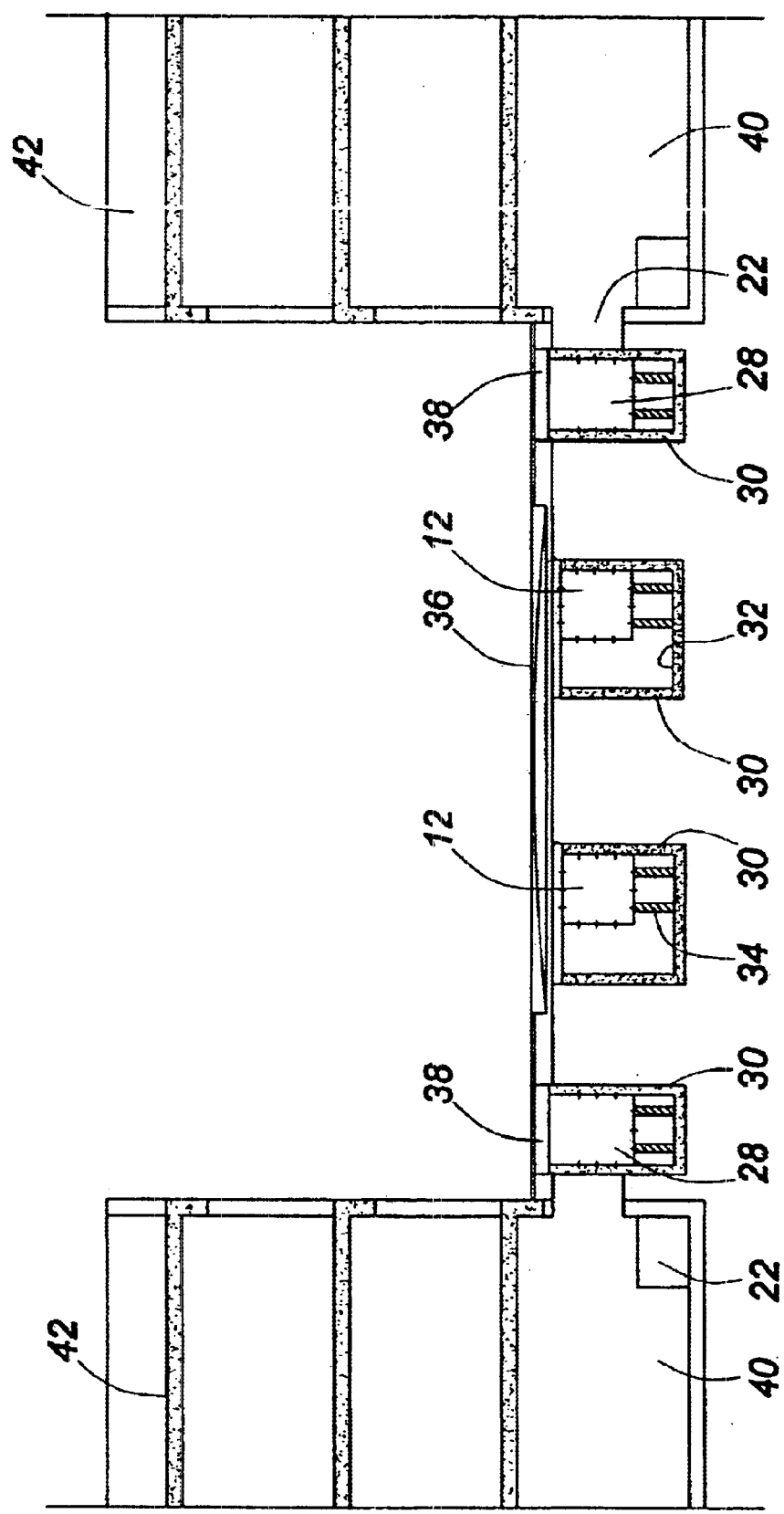
FIG. 5 is a cross-sectional view at line A—A in FIG. 3 of an embodiment of the transportation system of the present invention shown located under a sidewalk and road and proximal to buildings.

FIG. 5 depicts a cross-section across the line A—A in FIG. 3. Branch channels 28 are located in tunnels 30 located under the sidewalk 14, whereas transport channels 12 are located in tunnels 30 under the road 36. Branch channels 28 and transport channels 12 are held off the lower surface 32 of the tunnels 30 by spacers 34. Branch channels 28 are accessible through removable platforms 38 located at intervals above them. The top surface of the platform 38 is preferably substantially level with and parallel to the top surface of the sidewalk 14, to facilitate normal pedestrian traffic on the sidewalk 14. Branch channels 28 communicate with personal stations 22 located in the basement 40 of buildings 42. The subspace 33 (best seen in FIG. 6b) within the tunnel 30, under the channel may be used to run communication cables or other material involved in the control of the system. Alternatively or additionally, this subspace 33 can be used to run other suitable materials for other parties, such as the telecommunications lines or suitable utility lines or conduits or piping.

In one embodiment of the invention the operator 52 is adapted to receive instructions from at least one controller to facilitate the movement of the container 18 within at least two regions of the system wherein movement of the container 18 between the regions is accomplished by means other than or in addition to the transport system 10. For example, an aircraft passenger can place his luggage in a container 18 and send it through the system 10 from a personal station 22 or a public station 16 near his home. The luggage will be transported in the container 18 to the airport where the container 18 containing the luggage will be directed to and loaded on the aircraft for further transport by air. Upon landing, the container 18 containing the luggage will enter a different region of the transport system 10 and will be transported to the passenger's hotel or to a connecting flight, where appropriate. Where luggage is to be inspected by a Customs agent, the container 18 may be summoned by the Customs agent for inspection by providing instructions to the controller and summoning the passenger to the inspection area. This movement across discontinuous regions of the system 10 is preferably accomplished by adaptation of the operator 52 to remember information including intermediate destinations (e.g. the departure airport) and ultimate destination (e.g. the hotel). The operator 52 preferably communicates with the controller in each region to facilitate movement from point-to-point.

While the above example involves transhipment which is generally and preferably unnecessary when using the system 10, it illustrates the ease with which the system 10 can be integrated into existing transport networks to encourage greater efficiency within and between those networks.

In an embodiment of the invention, the system 10 is adapted to permit warehousing of content in containers 18. In this embodiment, content is placed in one or more containers 18 which then move through the system 10 to a storage area. The container 18 exits the storage area and moves to a destination in response to a signal from the controller, which may be programmed at the time of storage or at another time, and may cause shipment at a set time or in response to a further instruction such as the receipt of an order for the cargo from a customer. Alternatively, the operator can be programmed to keep the container in storage for a prescribed time period, following which the operator causes the container to resume transit.

Figure 6A:
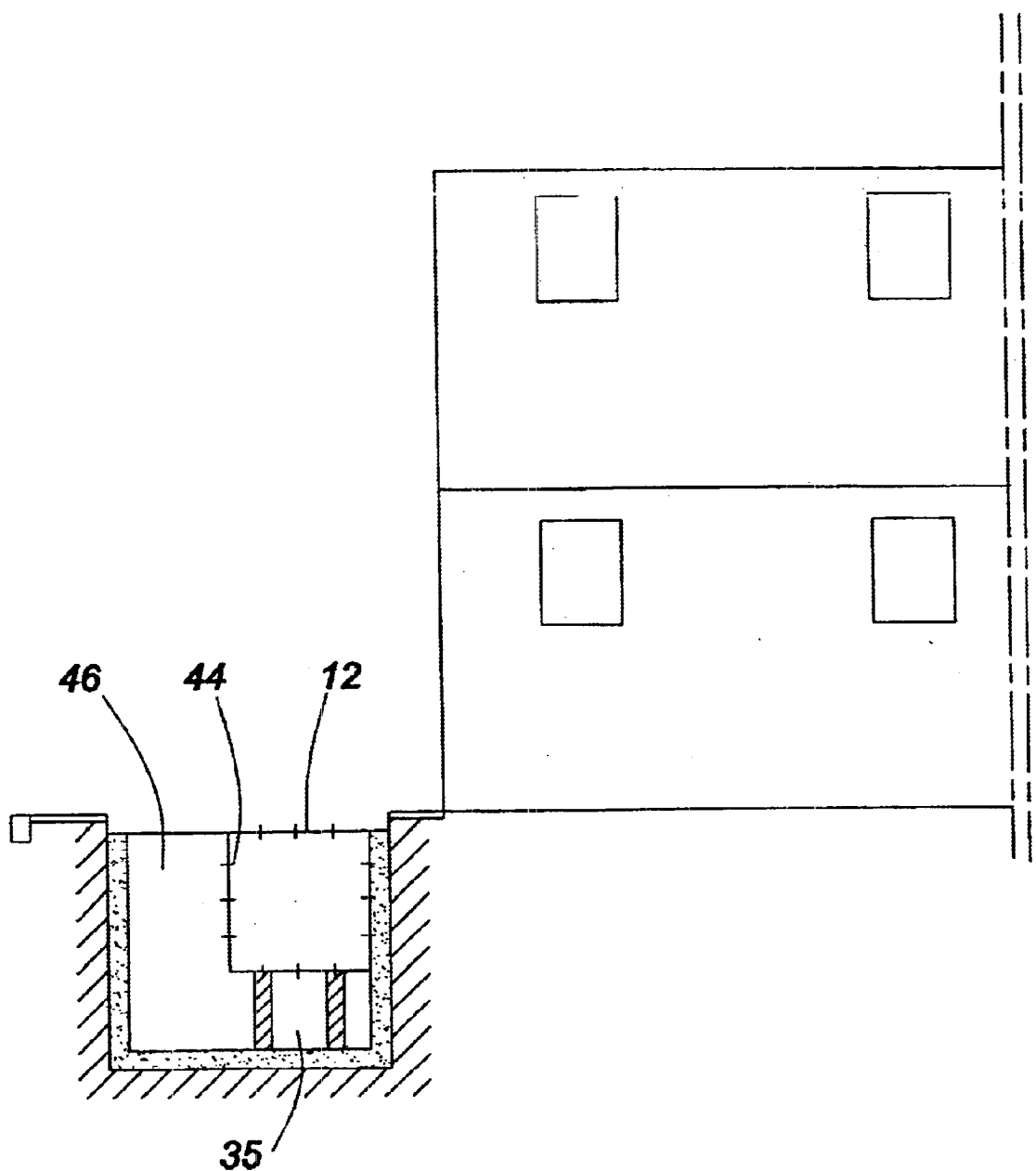
FIGS. 6a to 6d are cross-sectional views of an embodiment of the transportation system of the present invention.
Figure 6B:
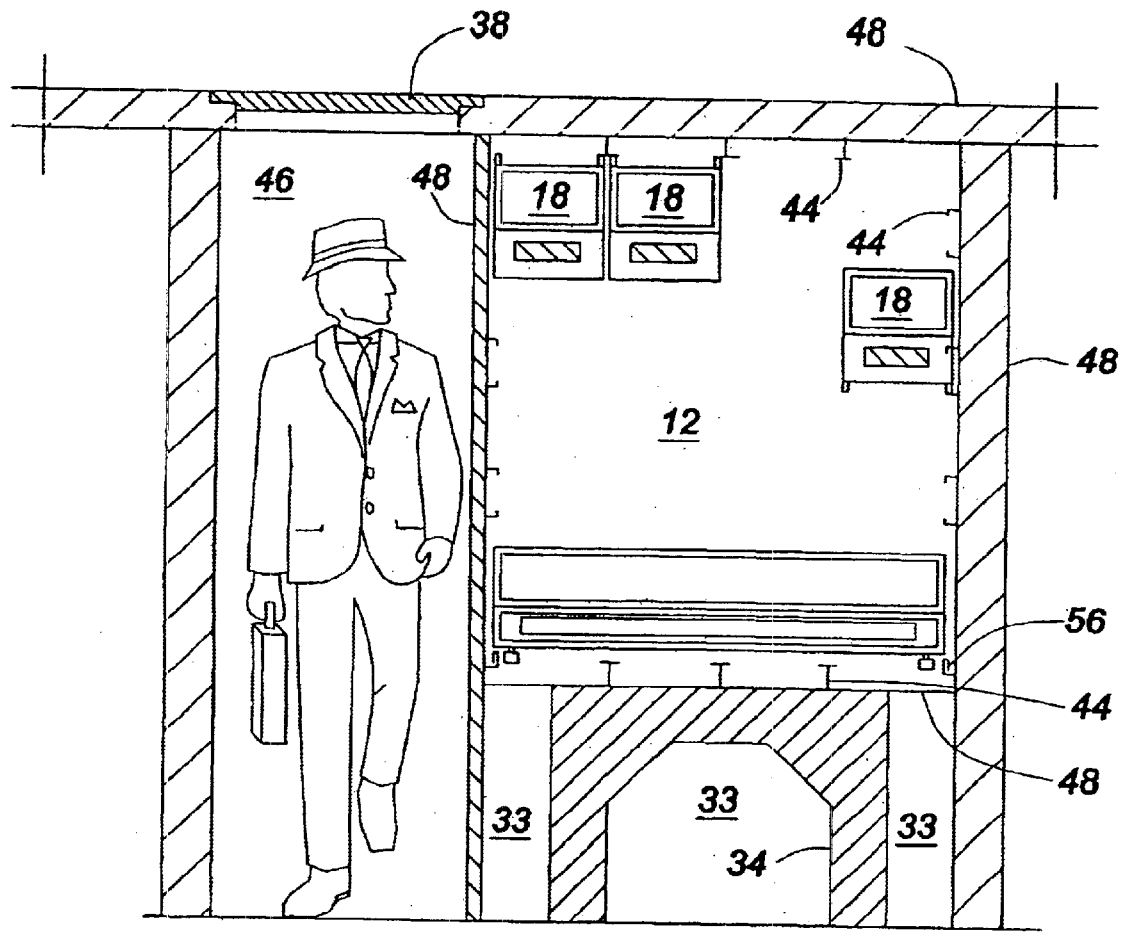

FIGS. 6a and 6b depict cross-sections of embodiments of the transportation system 10 of the present invention. The transport channel 12 has tracks 44 extending substantially parallel to the longitudinal axis L (shown in FIG. 4). The transport channel 12 is located in a tunnel 30 and is accessible by way of an access region 46 extending substantially parallel to the transport channel 12 and in communication with the outside by way of one or more removable platforms 38. It will be noted that the embodiment of FIG. 6a employs a 12-track system, whereas the embodiment of FIG. 6b employs a multi-track system.

FIG. 6b depicts a cross-section of an embodiment of the transportation system 10 of the present invention showing several containers 18 in transit in a transport channel 12. Each container 18 preferably engages at least two tracks 44 to secure the container in its position in the track, and to facilitate propulsion of the container 18. It will be apparent from FIG. 6b that multiple containers may be transported within a single channel 12 at the same time and, if desired, in different directions. In particular, each container 18 is positioned within the channel 12 so as to avoid interfering with other containers 18 within the channel 12. Access to the channel 12 is provided by means of an access region 46 extending substantially parallel to the transport channel 12, and adapted to allow periodic access to the channel 12, when needed.

Figure 6C:
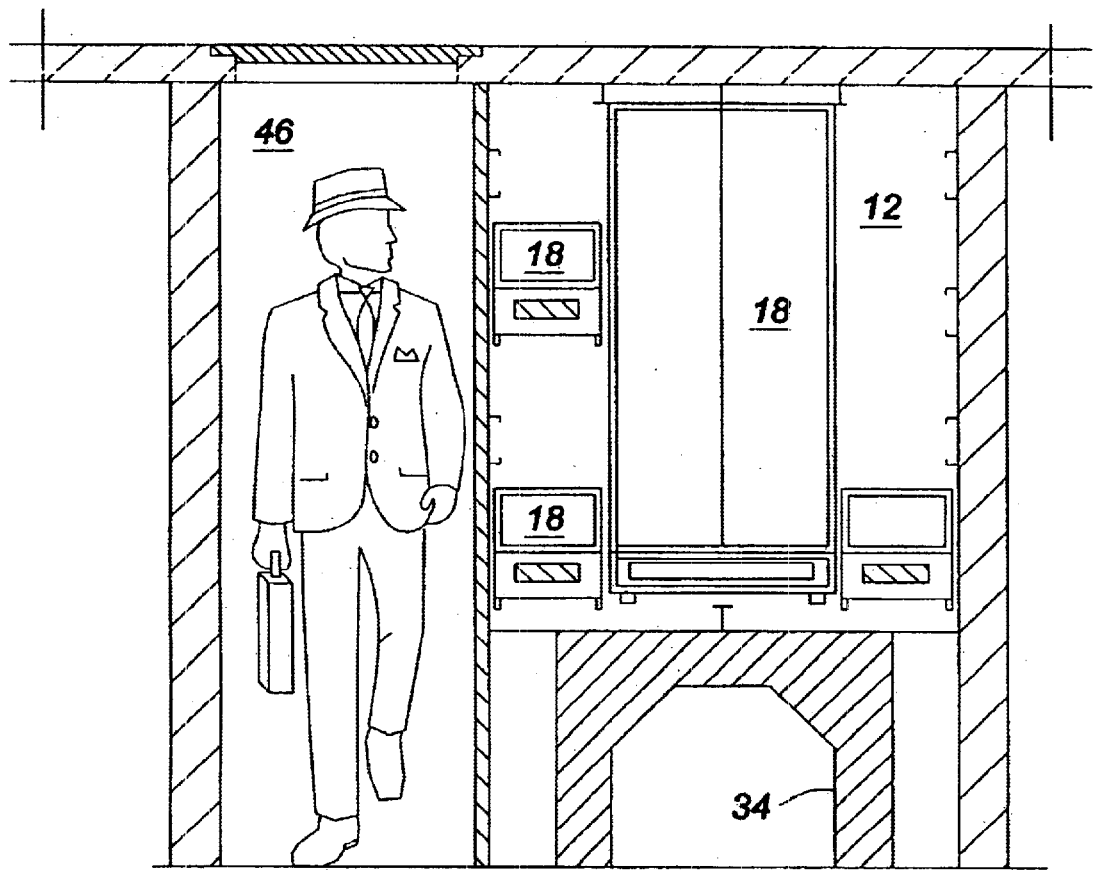
Figure 6D:
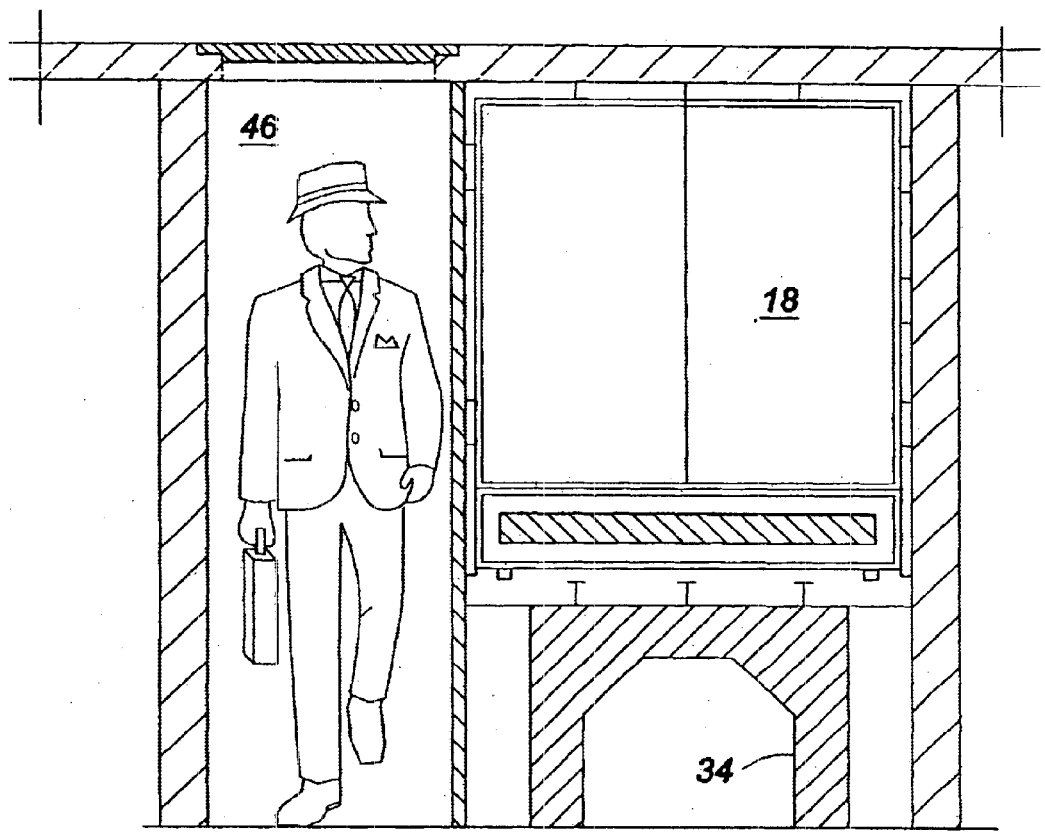

FIGS. 6c and 6d depict the embodiment of the channel 12 of FIG. 6b, with containers 18 of different sizes traveling therein. It will be appreciated that FIG. 6c depicts two small containers and one large container traveling away from the viewer, and one small container 18, in the lower right corner, traveling toward the viewer. FIG. 6d depicts a single container 18 occupying the entire channel and traveling away from the viewer.

Figure 7A:
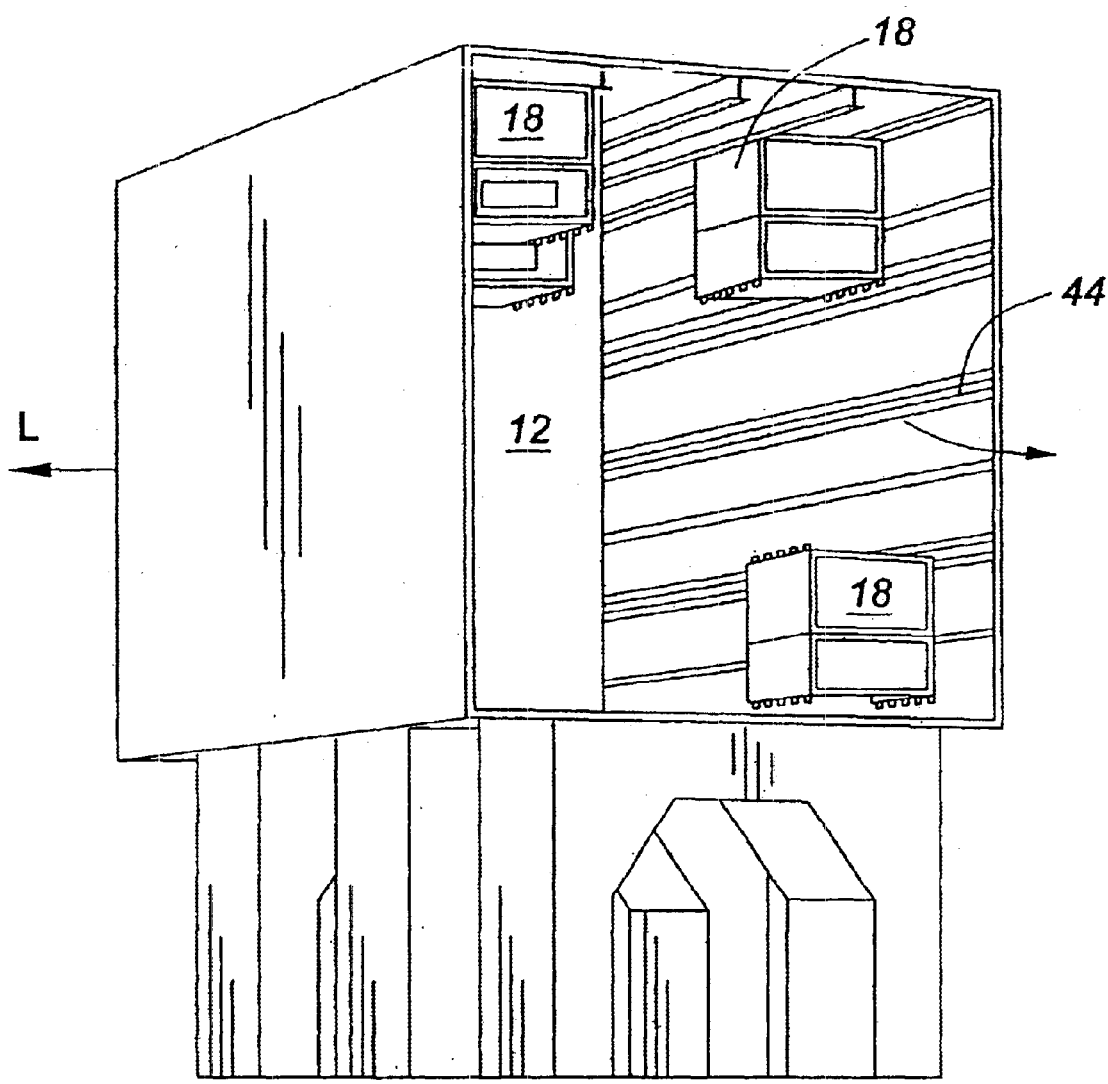
FIGS. 7a and 7b are perspective views of a portion of an embodiment of the transportation system of the present invention.
Figure 7B:
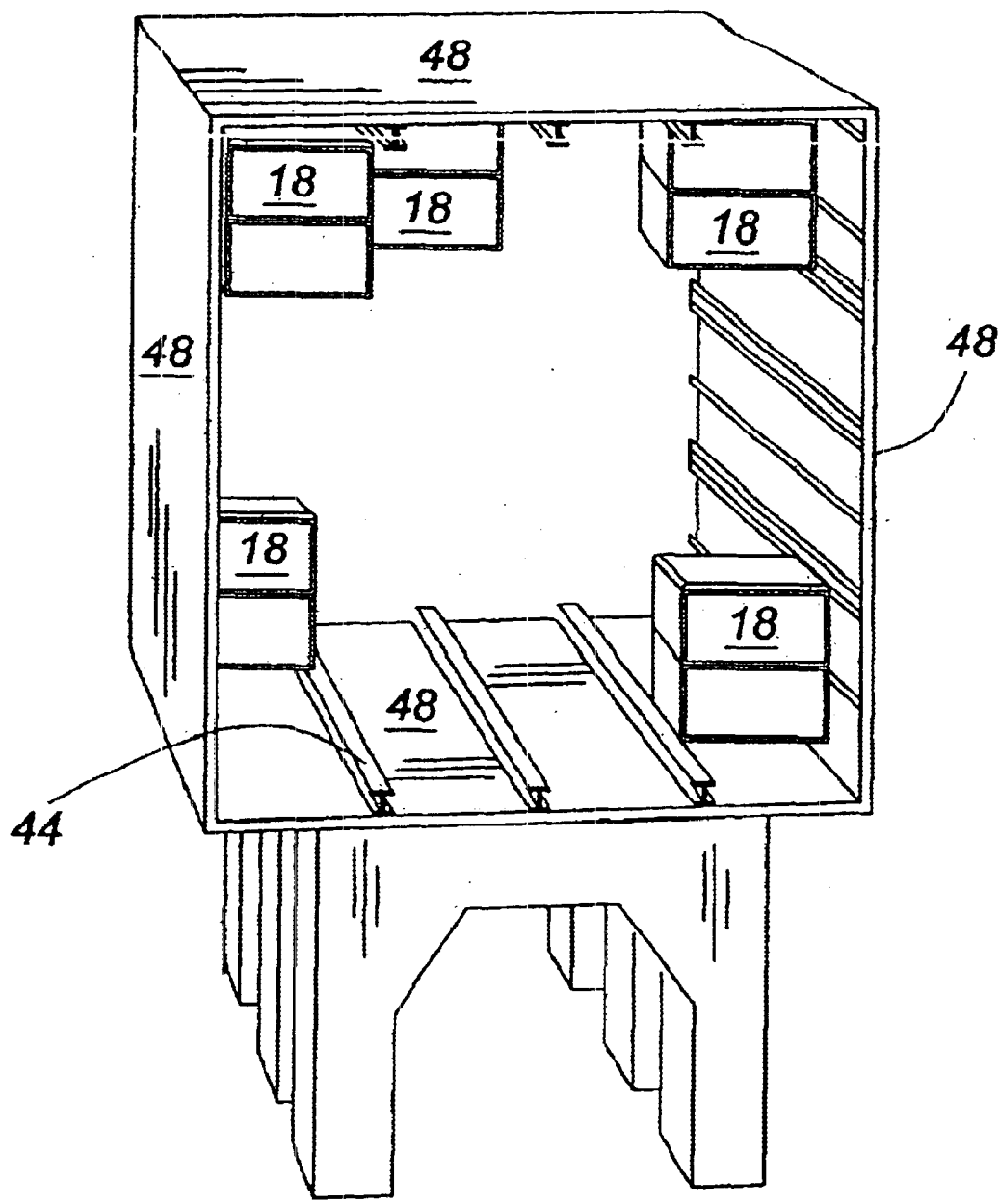

FIGS. 7a and 7b depict an embodiment of the transportation system 10 of the present invention, showing the transport channels 12 containing tracks 44 engaging containers 18 of various sizes and orientations for transport between a first point and a second point (not shown). Containers 18 move along the longitudinal axis L of the transport channel 12. Where necessary, containers 18 can be positioned or relocated to engage different tracks 44, thereby allowing one container to pass another, in either direction, within the transport channel 12.

Preferably, the transport channel 12 has a substantially square or rectangular cross-section defined by four walls 48. However, it will be appreciated that in some instances a single wall, or two walls may be suitable. As used herein, the term "wall" includes a substantially horizontal surface such as a roof or floor. The tracks 44 are preferably spaced against each of the four walls 48, thereby forming an elongate tube having a cage-like structure when viewed across its longitudinal axis L. The containers 18 engage at least one surface, which is preferably a track. Even more preferably, the containers 18 are adapted to releasably engage at least two tracks 44 which may be adjacent to the same or different walls 48.

At least two walls forming the channel may be defined by tracks.

Figure 8A:
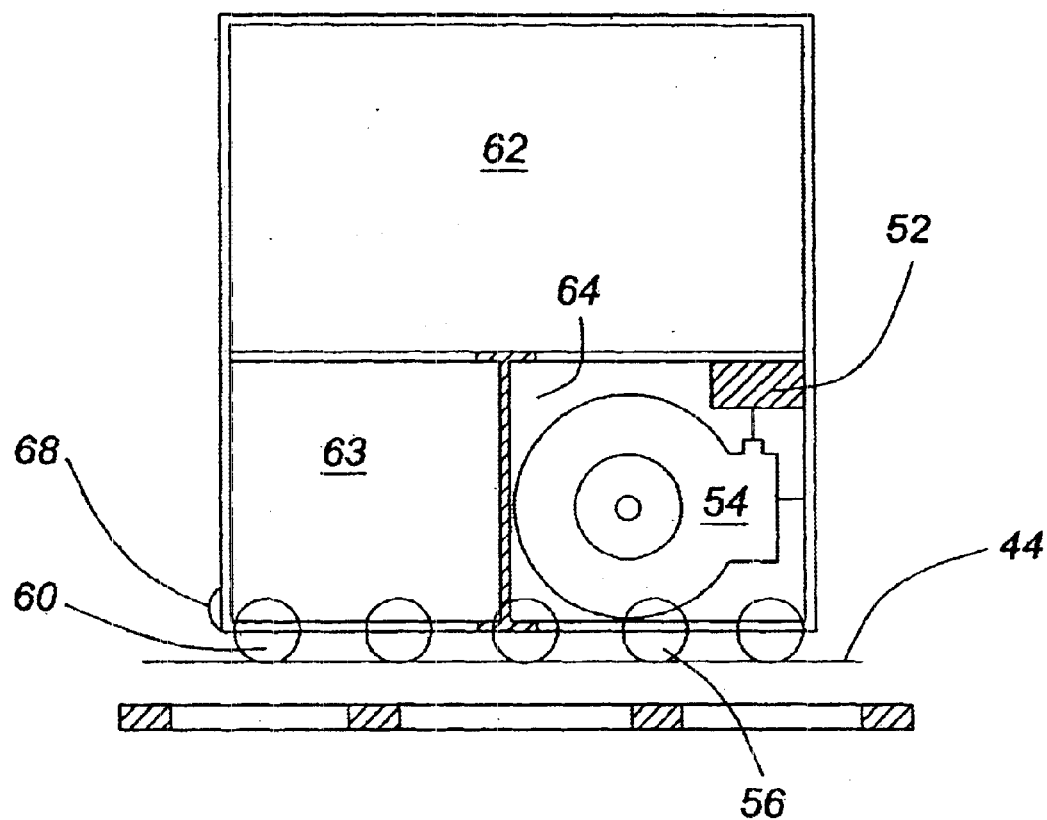
FIGS. 8a and 8b are views of an embodiment of a container of the present invention, with FIG. 8a showing a cross-section and FIG. 9b showing a rear perspective view.
Figure 8B:
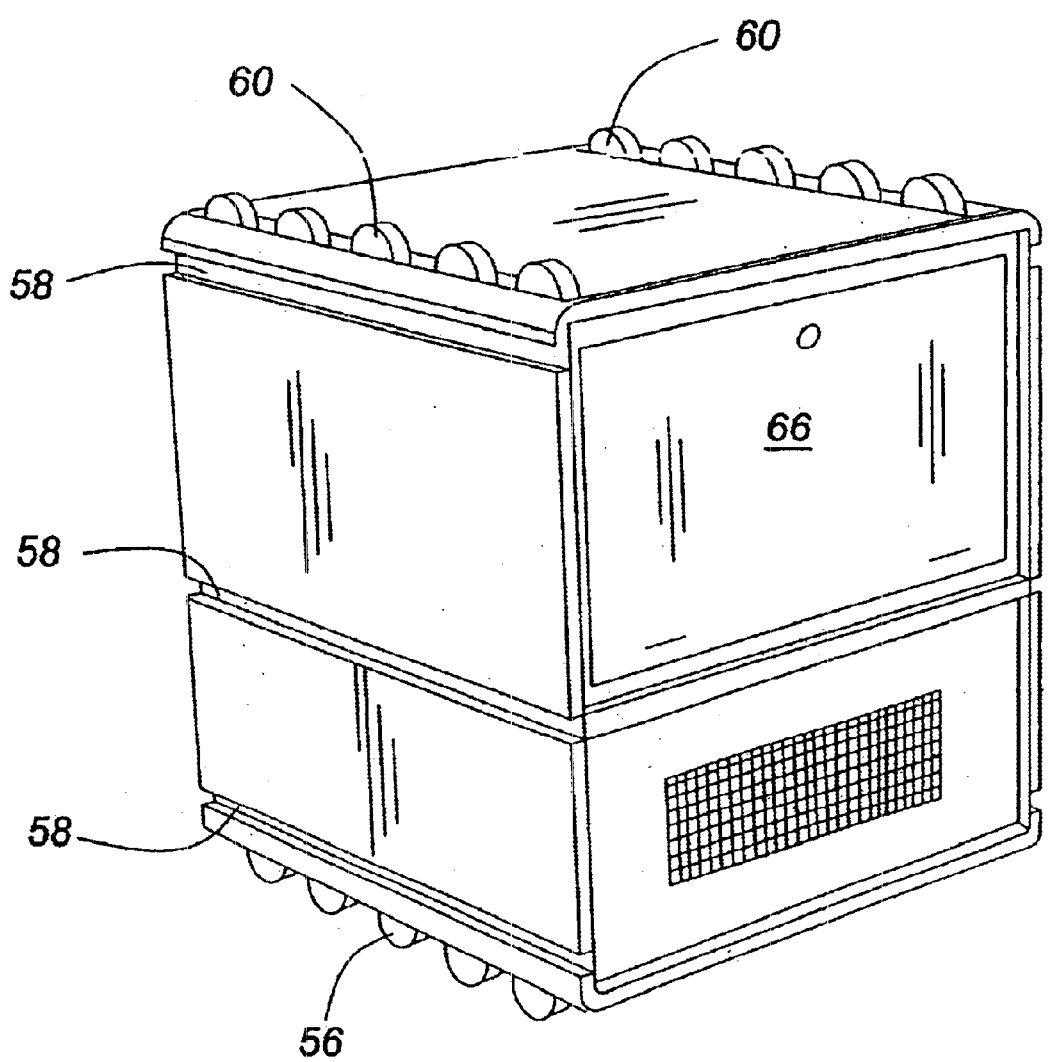

FIGS. 8a to 8b depict an embodiment of a container 18 of the present invention. FIG. 8a is a cross-sectional view and FIG. 8b is a rear perspective view. The container 18 includes an operator 52. A propeller in operative communication with the operator 52 is also provided. The propeller is adapted to move the container 18 in the transport channel 12 according to instructions received by the propeller from the operator 52. The propeller is preferably a reversible DC motor 54 operatively coupled to one or more driven wheels 56 and receiving power from a current carrying track or a suitable battery operatively connected to the propeller. The driven wheel 56 preferably frictionally engages a surface of the track 44, such that, upon actuation of the motor 54, the wheel 56 turns, causing the container 18 to slide along the transport channel 12. Non-driven wheels 60 adapted to facilitate movement of the container 18 may additionally be employed. The container 18 preferably has securers adapted to releasably engage tracks 44 within the transport channel 12 in a manner permitting the container 44 to slide on the tracks 44 without unexpectedly disengaging from them. Any suitable securer may be employed, including a slot 58.

Any suitable propeller may be employed, including a separate propeller included in each container, a single propeller propelling more than one container (such as towing locomotive-style), or a propeller including a mobile track or linkage which engages and pulls or pushes the container. When a single propeller is employed, a single operator in effective communication with the propeller regulates the movement of the containers. The mode of propulsion by the propeller may be any suitable mode, including a conventional motor driving one or more wheels, tracks or gears, compressed gas or fluid, or electromagnetic force.

The operator 52 is in effective communication with the controller and receives instructions transmitted by the controller. The operator 52 has an instruction receiver to receive instructions from the controller, an instruction processor to process the instructions, and a propeller regulator to govern the speed and direction of movement of the container. Preferably, the operator also includes a coordinate identifier to communicate information regarding the container's current position, rate and direction of movement, and status to the controller. In one embodiment, the coordinate identifier may also be adapted to communicate a shipper's orders to the controller, which then processes those and provides corresponding instructions to that, or another controller in order to carry out the shipper's orders.

The transportation system 10 has at least one controller which receives orders conveyed by shippers at public stations 16 and personal stations 22. Preferably, the system is subdivided into regions each containing one or more sections. Each region preferably has a regional controller each of which is in communication with a single central controller. While the described embodiments refer to a single controller, it will be apparent that many variations wherein several or many controllers cooperate are also contemplated. The controller processes the instructions received from each shipper pertaining to each particular container and transmits instructions to the operator 52 on each container 18 regarding the route and speed the container will follow to get to its destination. The controller also receives and processes information received from the coordinate transmitter on each container 18 and provides modified or updated instructions to containers as needed to reduce delays and facilitate efficient and safe delivery.

In an embodiment of the present invention, the containers 18 are substantially modular to facilitate efficient cargo transportation. Preferably, containers 18 of different sizes are available, to accommodate different sized content, and to optimize use of space in the channel and along the tracks. As used herein the term "modular" includes container design which facilitates the appropriate aggregation of containers for efficient use of space in the channel.

Containers 18 preferably include securers complimentary to the tracks 44 within the regions of the system 10 in which they are used.

Preferably, each container 18 is adapted to travel along one or more tracks 44 by engagement of securers on the container 18 with those tracks, and engagement of the propeller with a track 44 or the channel 12 proximal to the tracks 44 engaged by the securers. While the use of two tracks is preferred, it will be apparent that any reasonable number of tracks may be used with a suitably adapted container. For example, a single track may be used where the securers are adapted to engage a single track and to permit the container 18 to slide along that track when propelled.

Preferably, containers are adapted to aggregate together to facilitate and maximize mass-transit of containers. This may enhance efficient use of channel space and allow the use of highly-powered propellers to move groups or trains of containers over long distances quickly, following which individual containers can preferably be transported individually to their distinct destinations.

FIG. 8a depicts a cross-section of a container 18 having a driven wheel 56 adapted to engage an inner surface of track 44. The container 18 preferably includes a cargo region 62 which is distinct from the propeller region 64. A second cargo region 63 may also be provided.

FIG. 8b depicts a perspective view of an embodiment of a container 18 of the present invention, viewed from behind. The container includes a driven wheel 56, a plurality of non-driven wheels 60 and securers in the nature of slots 58 each adapted to engage a track 44, thereby permitting the container 18 to slide along the track 44. The container 18 preferably includes a cargo door 66 adapted to open to permit access to the cargo regions 62.

While a fully enclosed container is depicted and preferred, it will be appreciated that other embodiments of containers are contemplated in some circumstances, including platform-like "flat-bed" containers, and topless containers for use with suitable securers.

It will be appreciated that containers 18 may include multiple securers, and driven wheels adapted to alternatively engage tracks extending at angles to one another, for example when moving from a horizontal channel to a vertical channel.

In some instances, it will be desirable to include an attacher 68 to the front or back of the container 18, to facilitate movement of the container 18 alone or in a train across level surfaces, up inclines, or in vertical channels.

In an embodiment of the invention, the container 18 has a lock and a lock regulator. The lock regulator receives instructions from the operator 52. When the controller receives a signal from the coordinate transmitter indicating that the container is at its destination and that all necessary steps and security checks required by the shipper and receiver have been completed, the controller sends a signal to the operator, instructing the operator to send a signal to the lock regulator to open the lock. Upon receipt of this signal, the lock regulator causes actuation of the lock mechanism to unlock the container.

Figure 9A:
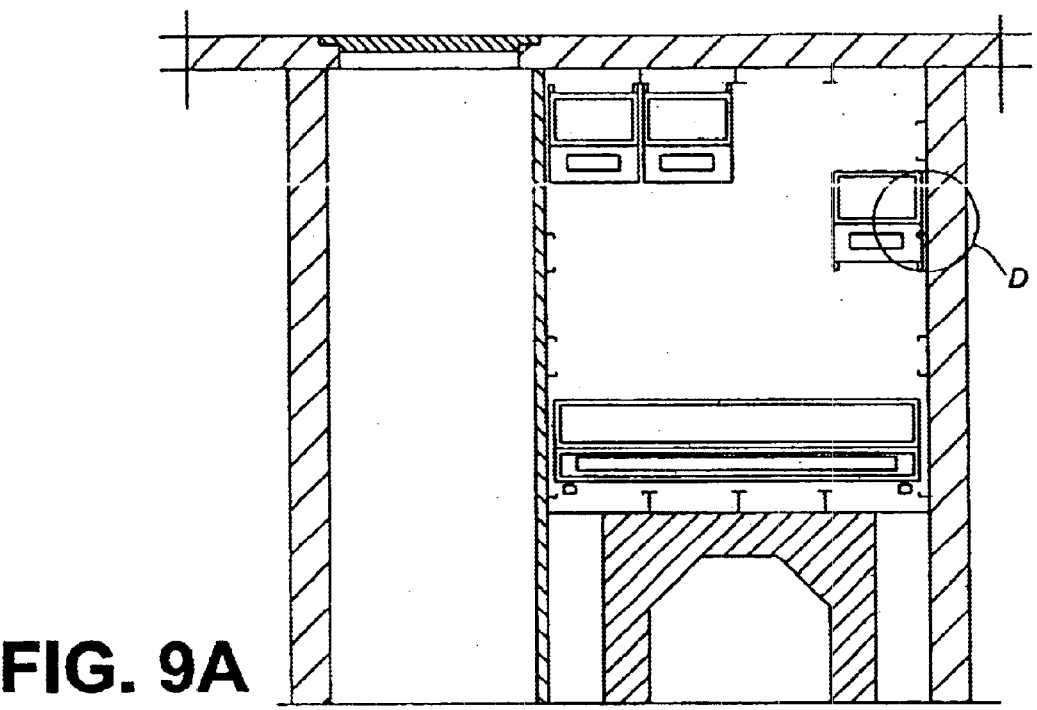
FIGS. 9a and 9b are cross-sectional views of a portion of an embodiment of the transport system of the present invention.
Figure 9B:
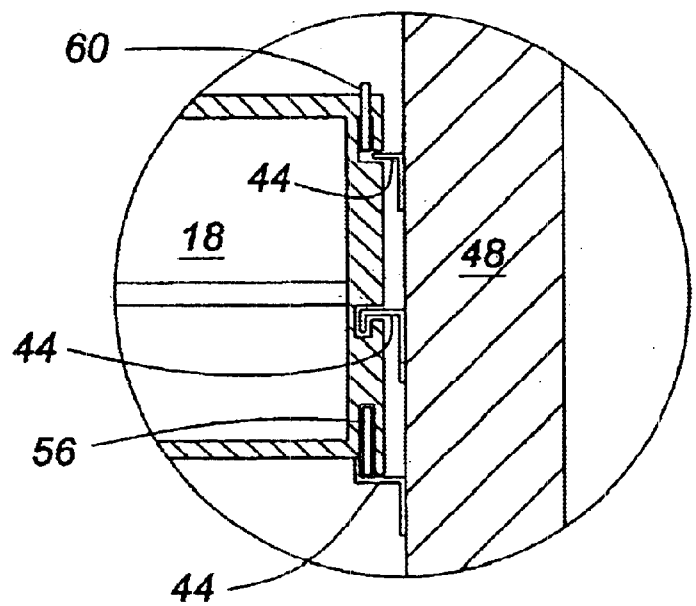

FIGS. 9a and 9b depict a cross-section of an embodiment of the transportation system 10 of the present invention. FIG. 9a depicts the embodiment of FIG. 6b, and indicates, at "D", the region of that figure which is enlarged and presented in more detail in FIG. 9b.

FIG. 9b depicts, in detail, a container 18 engaging tracks 44 secured to the wall 48, wherein a driven wheel 56 and a non-driven wheel 60 are shown engaging the tracks 44. It will be appreciated that the tracks 44 may be formed in any suitable shape. Preferably, tracks on the top and bottom walls 48 are substantially "I"-shaped, whereas the tracks on the side walls are patterned to include two substantially opposing "J"-shaped tracks (or a "J"-shaped track paired with a flattened "Z"-shaped track, as depicted in FIG. 9b). The tracks 44 are adapted to engage corresponding slots 58 in the container 18. One or more substantially "L"-shaped tracks may also be provided to provide a further support surface engagable by a securer, such as a slot 58 and/or a driven wheel 56 or a non-driven wheel 60.

It will be appreciated that many tracks will be effective and suitable. For example, tracks may be adapted to engage and direct the container by various means, including physical contact and other mechanisms such as magnetic attraction/repulsion. As used herein the term "track" refers to any suitable mechanism or means for defining the trajectory off a container in the channel. For example, the track may realize a trajectory defined by electromagnetic forces without tangible physical constraints.

It will be appreciated that securers of different varieties may be employed to engage corresponding tracks, including slots, hooks, ridges adapted to engage corresponding indents in the track 44, and magnetic securers. In some instances it will be desirable to place non-driven wheels on more than one surface of the container, to facilitate transportation of the container within the channel 12.

Figure 10A:
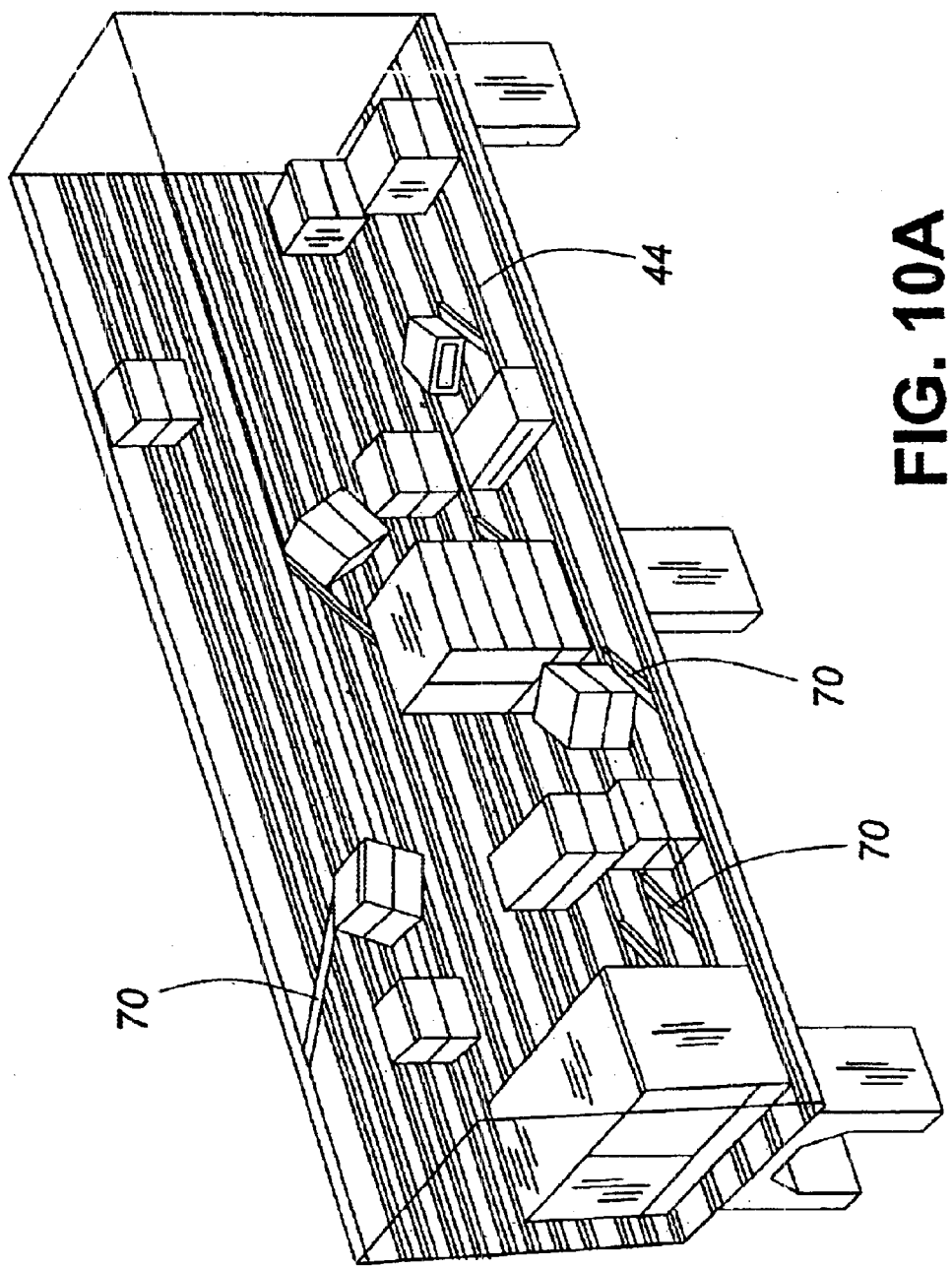
FIGS. 10a, 10b and 10c are depictions of portions of embodiments of the transport system of the present invention focusing on an embodiment of transfers between tracks.

FIG. 10a depicts an embodiment of a portion of the system 10 of the invention wherein containers 18 can switch tracks 44. In the depicted embodiment, a container 18 can change to an adjacent track 44 by engaging one or more transfers 70 which direct the container 18 to the adjacent track 44. It will be readily understood that a variety of suitable track switching mechanisms are possible and contemplated, in addition to the embodiment discussed in detail. For example, magnetic track switching mechanisms are contemplated, as are grasping arm mechanisms operatively connected to the container. Additionally, where the track is defined by electromagnetic forces, electromagnetic forces may also be employed to control the movement of the container in more than one direction within the channel. Such movement may be vertical, horizontal, or a combination thereof, with simultaneous longitudinal movement when necessary or desired.

Figure 10B:
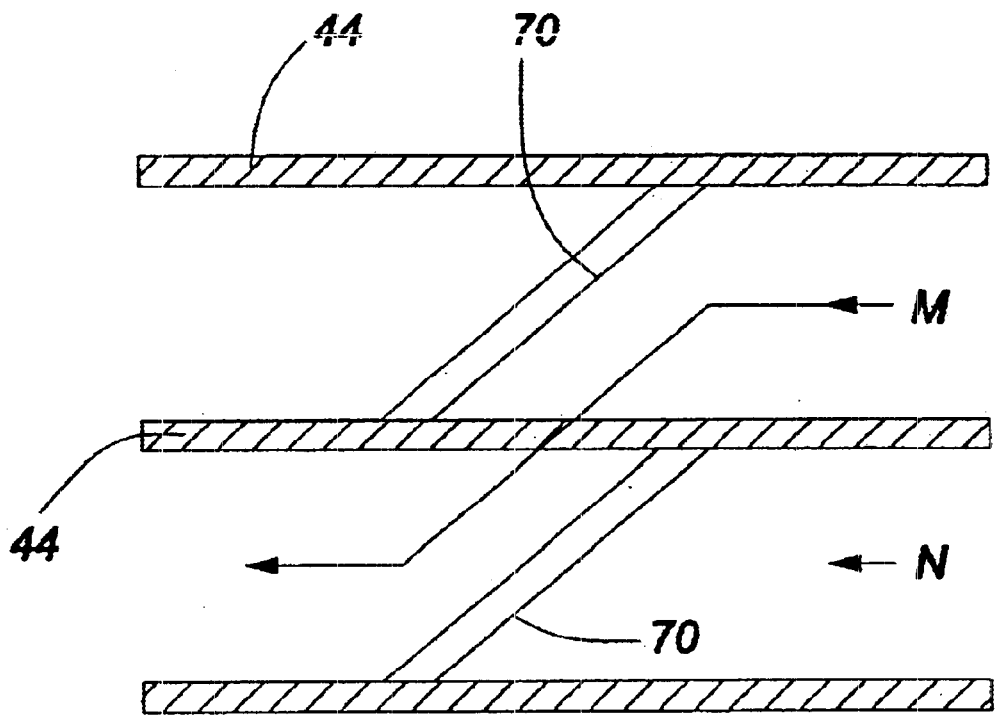

As depicted in FIG. 10b, a container 18 (not shown) moving in an initial direction of movement M switches tracks through engagement with one or more transfers 70, and ultimately continues in final direction of movement N. The path followed by the container 18 is shown in broken lines.

Figure 10C:
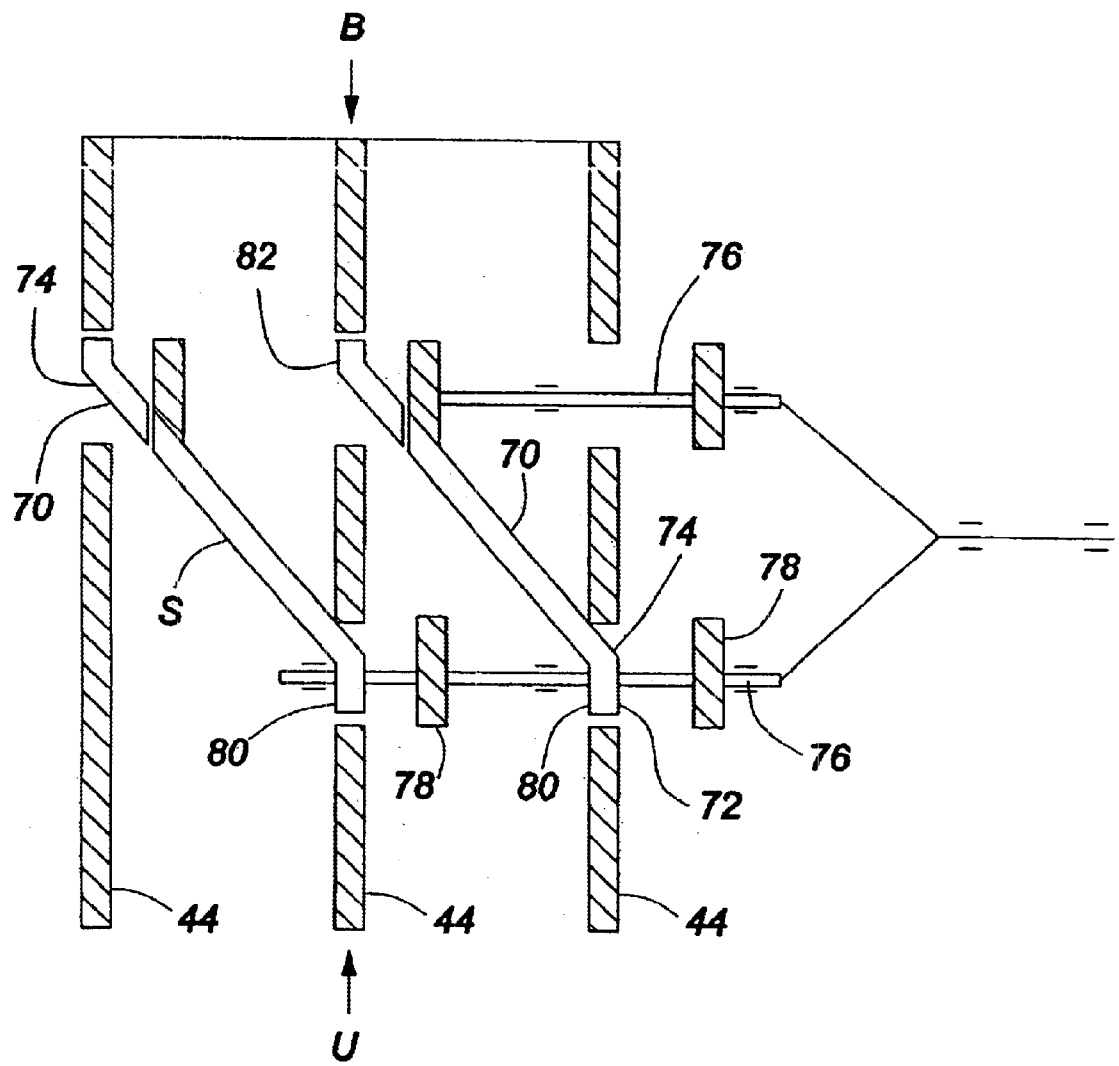

One embodiment of a pair of transfers 70 of the present invention is depicted in FIG. 10c showing a pair of transfers 70 adapted to switch the tracks 44 engaged by a container 18 moving in direction "U". When a track change is desired, the transfer 70 is moved to position "S", shown in FIG. 10c. The transfer 70 has an insert 72 which slides substantially into a gap 74 formed in the track 44 when the transfer moves to position "S" and which is adapted to guide a container 18 (not shown) to an adjacent track 44. In the depicted embodiment, a portion 78 of the track 44 is detached from the remainder of the track 44 and secured to a slide 76 which is adapted to move the portion 78 in and out of substantial alignment with the rest of the track 44. The transfer 70 is also secured to the slide 76 such that when the portion 78 is moved out of alignment, an upstream region 80 including an insert 72 comes in to substantial alignment with the track 44, permitting a container 18 (not shown) to be guided by the transfer 70. The downstream region 82 of the transfer 70 is adapted to guide the container on to the new track 44. While the transfer regions are described as "upstream" and "downstream" these descriptions are provided for ease of description only, and it will be readily appreciated that containers 18 may move, and be transferred between tracks 44 when moving in either direction on transfers 70. For instance, when the transfer 70 is in position "S", a container moving in direction "B" contacts the downstream region 82 and is guided on to the transfer 70, where it continues to the upstream region 80 and is released on to the other track 44 to continue its journey.

In the depicted embodiment, two slides 76 are joined at one end to facilitate the coordinated movement of both slides 76, portions 78 and transfers 70. Preferably, transfers 70 are located at regular intervals along the tracks. Even more preferably, the space between transfers is no greater than the average container length, thus facilitating rapid track switching when necessary.

As will be readily appreciated, numerous transfer configurations are possible and contemplated for use with containers 18 having corresponding securers. In particular, it is preferable to employ a transfer 70 which will readily engage the container 18 and transfer it to an adjacent track 44 or the track of an interconnecting channel without binding or slowing the container down significantly.

Thus, it is possible for containers 18 to be re-organized within the channel to facilitate the movement of one container past another.

The controller determines the route and speed of containers 18 in the transport channels 12 and the branch channels 28. In order to determine the route and speed of each container in the transport system 10, the controller is preferably adapted to perform a method of route and position selection and review comprising the steps of:

(a) identifying origin and destination points and determining at least one route between these points;
(b) determining the number of sections along the determined route;
(c) determining the traffic within each section prior to entering that section;
(d) determining the speed of other containers traveling within a section prior to entering and while in that section;
(e) determining the size of the container and the number of slots needed for its transfer;
(f) providing instructions for the positioning of the container in the channel to avoid undesirable contact with another container;
(g) providing instructions to the operator for the direction and speed of container movement within the channel and for the movement of the container across sections and the merger of the container into other container traffic in various sections.

Preferably the system 10 further includes sensors adapted to provide to the controller information regarding container weight, channel conditions and other relevant information such as temperature and weather conditions, etc. The controller preferably considers this further information in determining the most suitable route for container transport.

Preferably, the controller is also adapted to calculate the shortest path between the origin and destination point, as well as the fastest path at a given time in light of traffic conditions and to select the best path. In one embodiment, the controller also assigns priorities to containers based on the service requested and price paid by the sender (for example, same-day, overnight delivery, etc.)

Thus, it is apparent that there has been provided a point-to-point transport system permitting the efficient simultaneous transport of more than one container between different starting and destination points.

I claim:

1. A system for transporting cargo within a plurality of containers from a first location to a second location, said system comprising:

a plurality of spaced tracks between said first and second locations for engaging and supporting said plurality of containers;

an elongate track support structure for supporting said tracks, comprising at least first, second and third track support surfaces at substantially right angles to each other, forming a channel in which said tracks are within the interior of said channel;

a plurality of self-propelled containers having at least three surfaces for facing said first, second and third track support surfaces, each of said surfaces having track engagement means for selectively engaging said tracks on any of said first, second and/or third track support surfaces, said containers each further comprising container drive means for propelling said container along said tracks and container control means for controlling operation of said drive means, said control means being in operative communication with a central controller;

a plurality of track switches to direct said container to switch between said tracks for changing the direction of travel of said container or for avoiding contact with a different of said containers, said switches being under the control of said central controller; and a central controller in operative communication with said switches and said drive means, said controller including signal processing means for receiving information corresponding to the location of said first and second locations, as well as the speed, location and direction of travel of each of said plurality of containers, and for providing instructions to said plurality of containers and switches to route said containers and to avoid undesirable contact between said containers.

2. A system as defined in claim 1 said plurality of tracks and track support structure comprises a branching network defined by of a plurality of regions.

3. A system as defined in claim 1, wherein said support structure comprises four support surfaces arranged in a substantially enclosed tube-like configuration, said plurality of self-propelled containers including track engagement means on at least four surfaces thereof for selectively engaging tracks on any of said four support surfaces.

4. A system as defined in claim 1, wherein said plurality of containers are modular and comprise individual containers for engagement with a lesser number of tracks and a greater number of tracks.

5. A system as defined in claim 1, wherein said first and second locations comprise stations for delivery and receipt of said containers.

6. A system as defined in claim 1, wherein said drive means of a said containers comprises an electric motor, driven by a power source selected from a battery within said car or an electrical current-carrying track associated with said tracks, said motor being operatively connected to at least one drive wheel.

7. A system as defined in claim 1, wherein said track engagement means comprises at least one slot recessed into a wall of said container, for engagement with a corresponding track.

8. A system as defined in claim 1 comprising a branching network of said track support structures and tracks wherein said channels comprise a plurality of interior cross-sectional areas within different regions of said network.

9. A system as defined in claim 1 wherein said switches are arranged to switch the track engagement of said containers on any of said support surfaces.

10. A system as defined in claim 1 for transporting said containers from point-to-point within said network, wherein said containers independently receive control information from said controller for uninterrupted movement from origin to final destination.

11. A system as defined in claim 8 wherein said containers are modular in size and independently controlled by said controller.

* * * * *